(12) United States Patent
Muth

(10) Patent No.: US 9,770,136 B1
(45) Date of Patent: Sep. 26, 2017

(54) HAND-HELD INERTIA NUTCRACKER

(71) Applicant: Steven K Muth, Placitas, NM (US)

(72) Inventor: Steven K Muth, Placitas, NM (US)

(*) Notice: Subject to any disclaimer, the term of this patent is extended or adjusted under 35 U.S.C. 154(b) by 0 days.

(21) Appl. No.: 15/340,306

(22) Filed: Nov. 1, 2016

(51) Int. Cl.
*A47J 43/00* (2006.01)
*A23N 5/00* (2006.01)
*A47J 43/26* (2006.01)

(52) U.S. Cl.
CPC .............. *A47J 43/26* (2013.01); *A23N 5/00* (2013.01)

(58) Field of Classification Search
CPC .................................... A47J 43/26; A23N 5/00
USPC ................... 99/571, 572, 577, 578; 30/120.2
See application file for complete search history.

(56) References Cited

U.S. PATENT DOCUMENTS

| | | | |
|---|---|---|---|
| 1,044,448 A * | 11/1912 | Flis | A23N 5/00 99/578 |
| 1,094,698 A * | 4/1914 | Bostrom | A47J 43/26 30/120.2 |
| 1,412,249 A | 4/1922 | McClung | |
| 1,883,529 A | 10/1932 | Buckwalter | |
| 2,069,877 A | 2/1937 | Fix | |
| 3,127,917 A | 4/1964 | Turner | |
| 3,435,863 A | 4/1969 | Dye | |
| 3,524,486 A | 8/1970 | Turner | |
| 3,667,511 A | 6/1972 | Van Der Wey | |
| 4,044,663 A | 8/1977 | Straw | |
| 4,438,687 A | 3/1984 | McNiel | |
| 5,333,384 A | 8/1994 | Graves | |
| 6,237,476 B1 | 5/2001 | Beauchemin | |
| 8,522,676 B2 | 9/2013 | Tangren | |

FOREIGN PATENT DOCUMENTS

| | | | | |
|---|---|---|---|---|
| DE | 2020211103169 | * | 10/2011 | .............. A47J 43/26 |
| FR | 2067178 | * | 8/1971 | .............. A47J 43/26 |

* cited by examiner

*Primary Examiner* — Reginald L Alexander
(74) *Attorney, Agent, or Firm* — Robert D. Watson

(57) ABSTRACT

A hand-held inertia nutcracker for removing shells from a variety of nuts. The nutcracker having multiple configurations according to user preference. The easy to use device allows for easy insertion of nuts and quick removal of the nut and shell material. The nut is automatically centered in the cracking chamber as it is inserted so that consistent performance is achieved. The nutcracker also automatically adjusts for a variety of types and sizes of nuts without operator intervention. The design allows for rapid repeatability in use, thereby taking most of the effort out of extracting the nut from the shell.

28 Claims, 13 Drawing Sheets

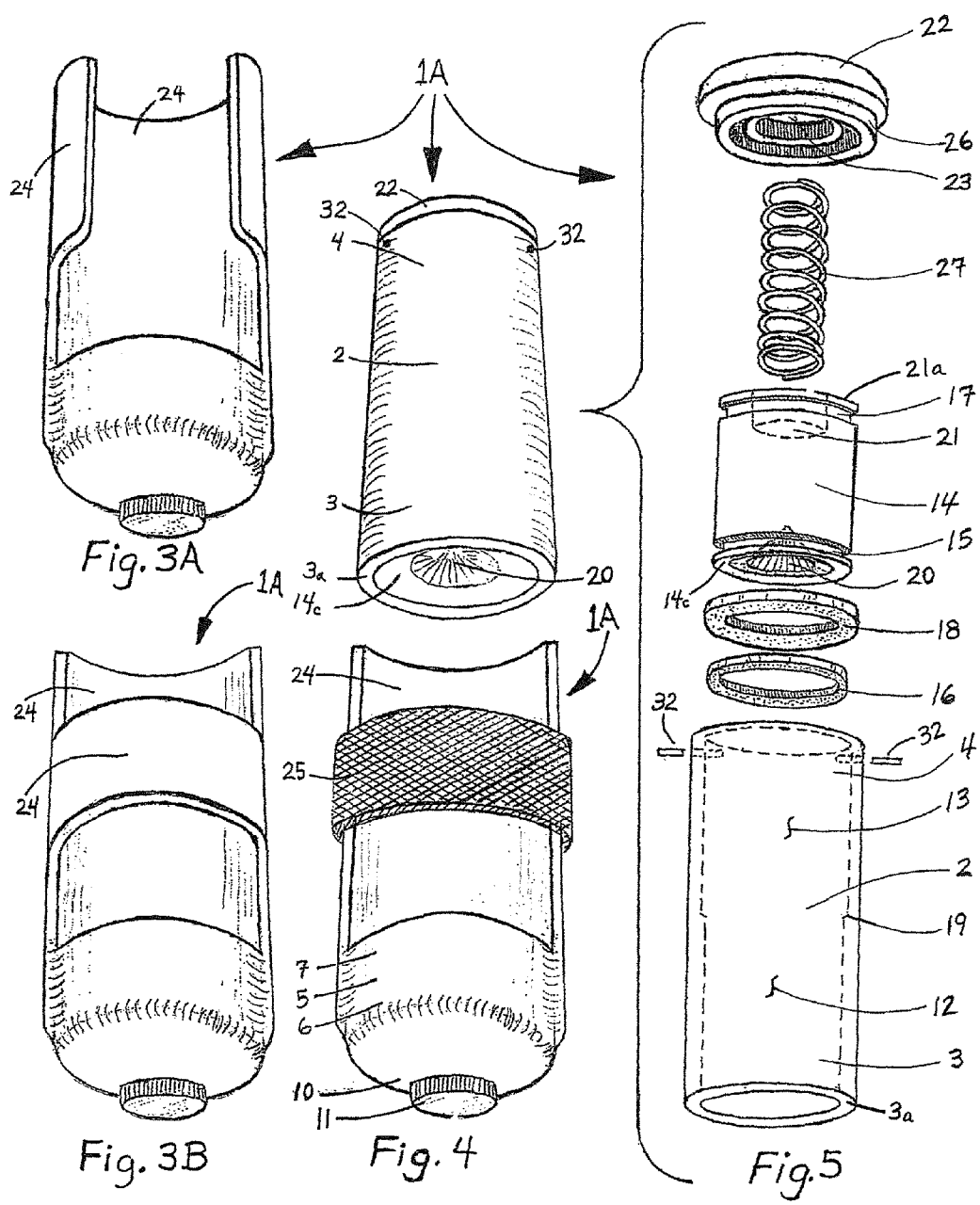

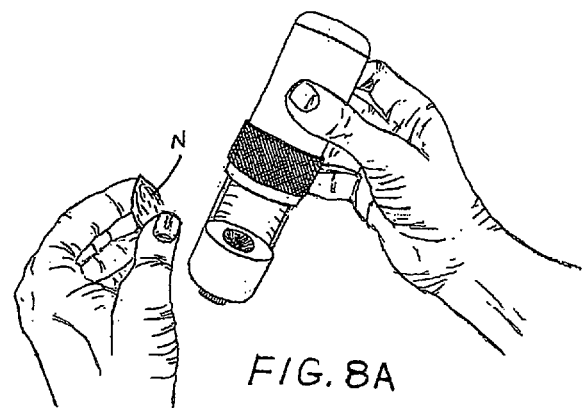
FIG. 8A
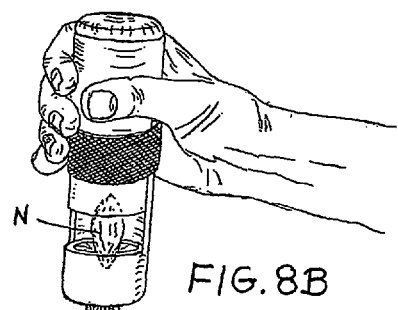
FIG. 8B
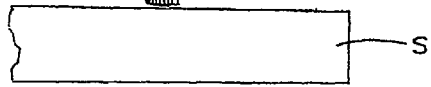
S
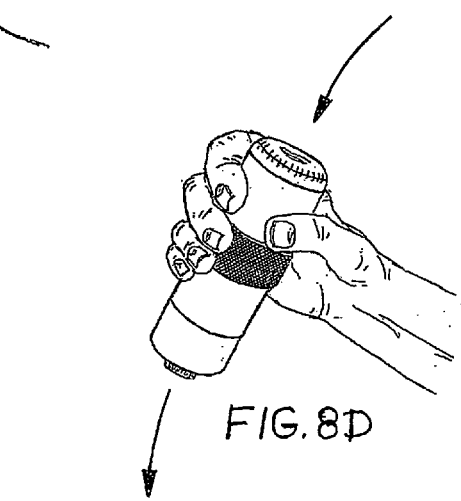
FIG. 8D
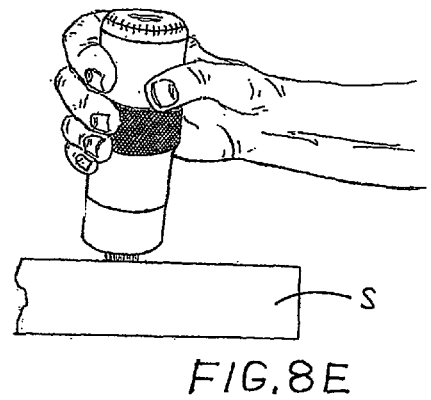
FIG. 8E
S
FIG. 8C
S

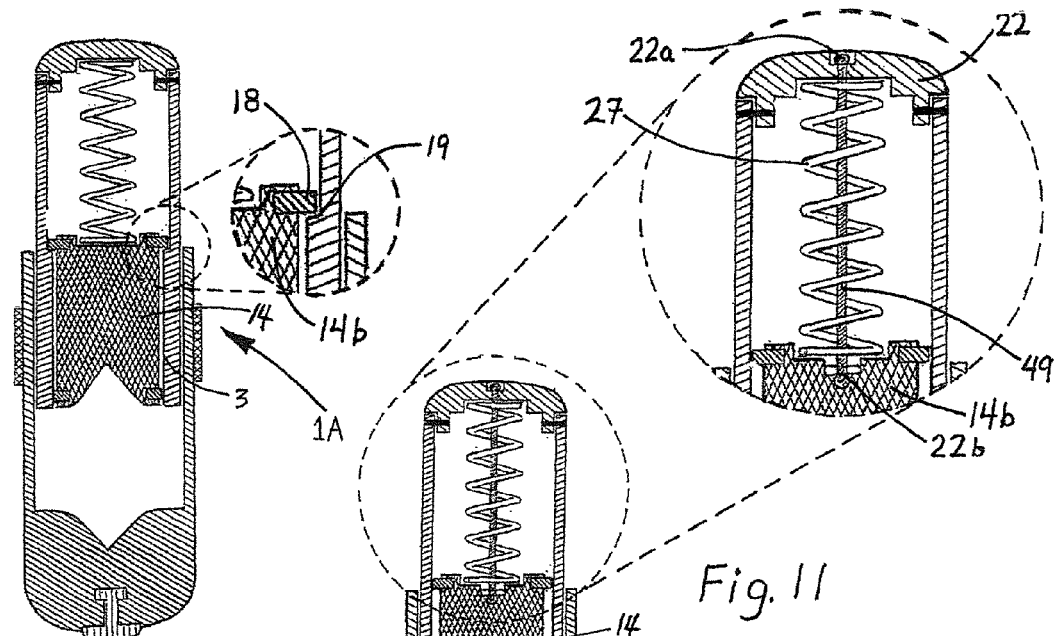
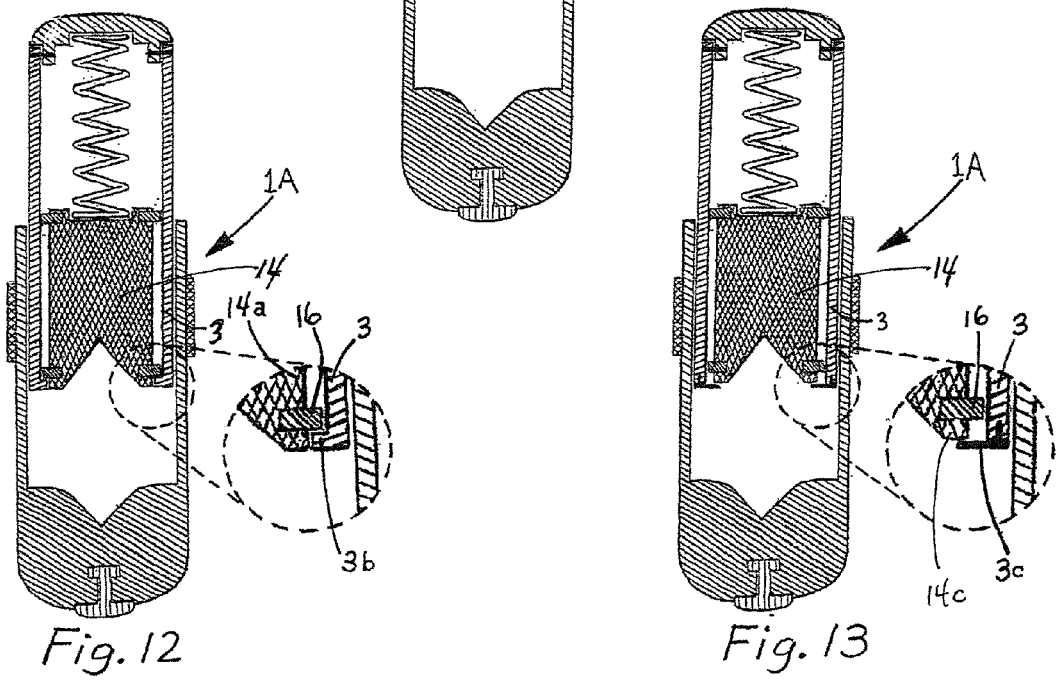
Fig. 10
Fig. 11
Fig. 12
Fig. 13

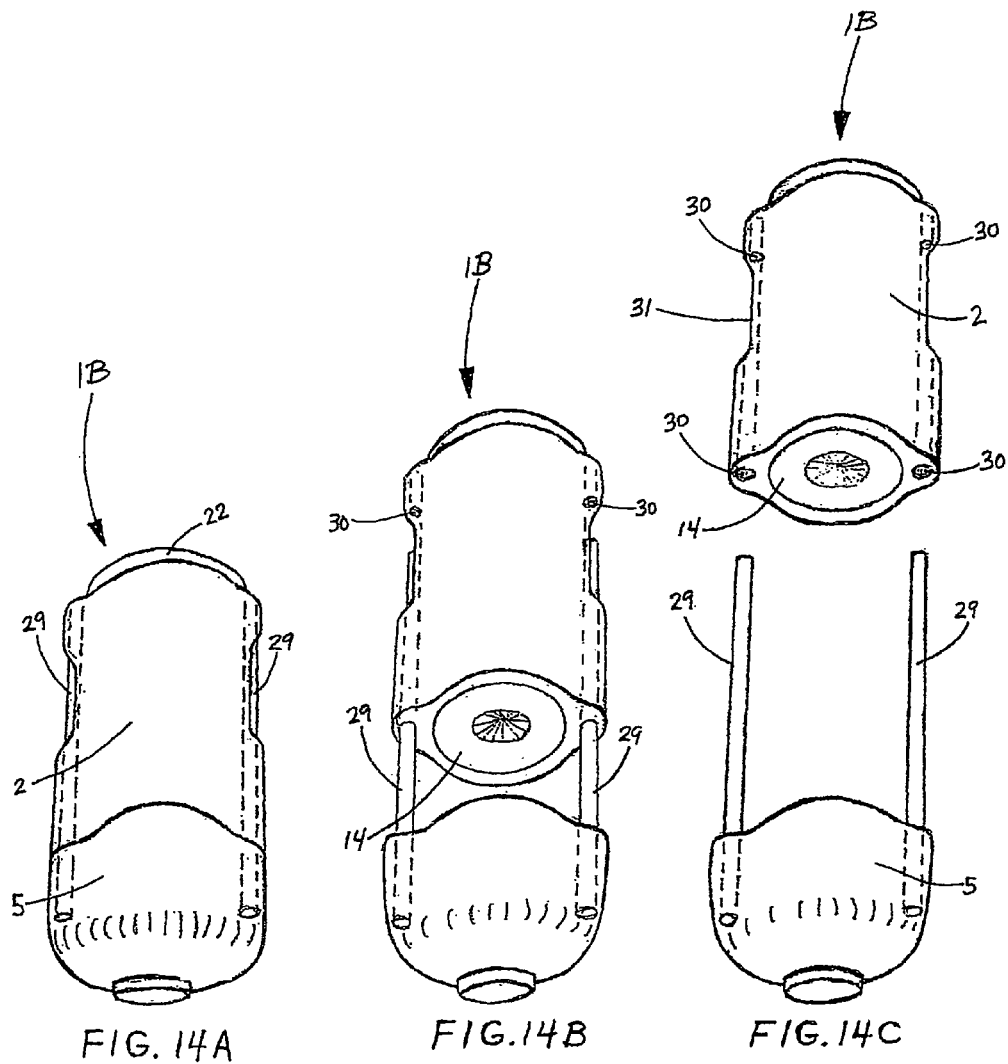

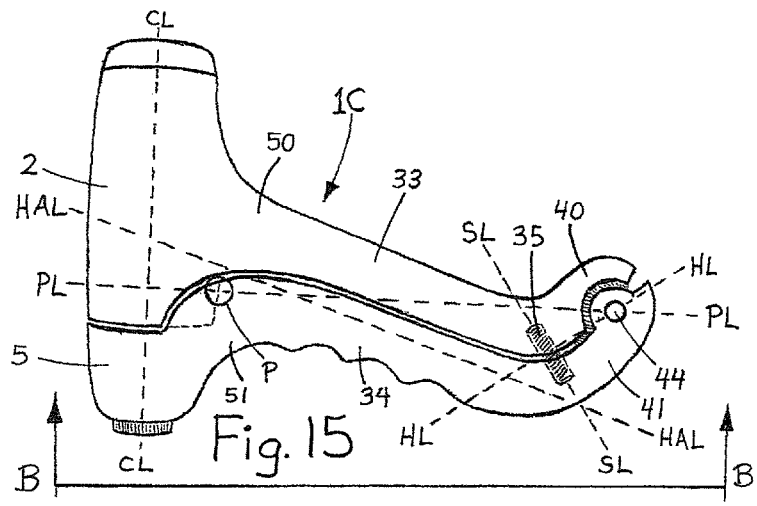
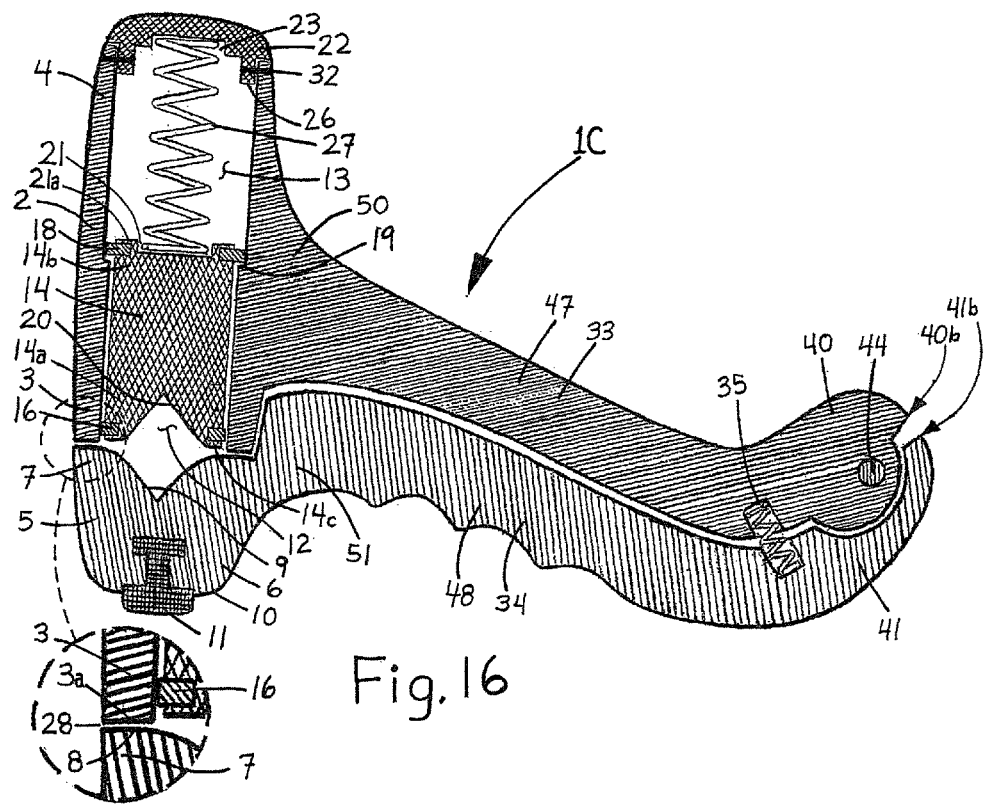

HAND-HELD INERTIA NUTCRACKER

FIELD OF THE INVENTION

This invention relates to the field of nutcrackers for cracking edible nuts.

BACKGROUND OF THE INVENTION

In the world of hand-held nutcrackers, there have been several types over the years. Various methods have been employed to create a force sufficient enough to crack nuts. One method uses the leverage of two or more handles (similar to pliers) which are squeezed together by the users' hand or hands to provide the cracking force. Another nut cracking method converts rotational motion into linear force by the user turning a threaded member against a nut in a vise type device. Yet another method uses a spring as a means to propel an impact member which strikes and cracks a nut. Many of these nutcrackers require relatively strong hands to operate, tend to scatter nutshells and yield a relatively small quantity of cracked nuts per time spent. Therefore, a need clearly exists for a better hand-held nutcracker.

SUMMARY OF THE INVENTION

This invention relates to a hand-held inertia nutcracker for cracking various sizes and types of edible nuts within an enclosed chamber by utilizing inertia of an impact member as the cracking force while confining the nut and nutshell fragments within the chamber prior to releasing the cracked nut into a receptacle.

BRIEF DESCRIPTION OF THE DRAWINGS

The accompanying drawings are illustrative of one or more embodiments of the nutcracker by way of example in which the reference numbers indicate the same or similar elements and in which:

FIG. 3A is a perspective view of an alternate embodiment of a portion of the hand-held inertia nutcracker 1A of FIGS. 1 & 2;

FIG. 3B is a perspective view of an alternate embodiment of a portion of the hand-held inertia nutcracker 1A of FIGS. 1 & 2;

FIG. 4 is a perspective view of the hand-held inertia nutcracker 1A, showing an upper and lower portion separately;

FIG. 5 is an exploded perspective view of the hand-held inertia nutcracker 1A, showing components of the upper portion of FIG. 4;

FIG. 8A is a perspective operational view of the hand-held inertia nutcracker 1A, shown in an expanded configuration prior to insertion of the nut;

FIG. 8B is a perspective operational view of the hand-held inertia nutcracker 1A, shown in an expanded configuration following insertion of the nut;

FIG. 8C is a perspective operational view of the hand-held inertia nutcracker 1A, shown in a compressed configuration;

FIG. 8D is a perspective operational view of the hand-held inertia nutcracker 1A, shown in a compressed configuration and raised to an elevated position;

FIG. 8E is a perspective operational view of the hand-held inertia nutcracker 1A, shown in an impact position;

FIG. 10 is a sectional view of the hand-held inertia nutcracker 1A showing a callout of the sectional view taken along section line A-A of FIG. 1 which shows a means of retaining an impact member within an upper body member bottom portion;

FIG. 11 is a sectional view of the hand-held inertia nutcracker 1A showing a callout of the sectional view taken along section line A-A of FIG. 1 which shows another means of retaining the impact member within the upper body member bottom portion;

FIG. 12 is a sectional view of the hand-held inertia nutcracker 1A showing a callout of the sectional view taken along section line A-A of FIG. 1 which shows another means of retaining the impact member within the upper body member bottom portion;

FIG. 13 is a sectional view of the hand-held inertia nutcracker 1A showing a callout of the sectional view taken along section line A-A of FIG. 1, which shows another means of retaining the impact member within the upper body member;

FIG. 14A is a perspective view of a hand-held inertia nutcracker 1B, according to another embodiment, shown in a compressed configuration;

FIG. 14B is a perspective view of the hand-held inertia nutcracker 1B, shown in an expanded configuration;

FIG. 14C is a perspective view of the hand-held inertia nutcracker 1B, shown in a partially disassembled configuration;

FIG. 15 is a side elevation view of a hand-held inertia nutcracker 1C, according to another embodiment, shown with a handle added;

FIG. 16 is a sectional view of the hand-held inertia nutcracker 1C showing a callout of the sectional view taken along the section line B-B of FIG. 15, shown in a compressed configuration;

DETAILED DESCRIPTION OF THE INVENTION

The following detailed description is of embodiments of the hand-held inertia nutcracker. Such description is not to be taken in a limiting sense, but is made merely for the purpose of illustrating the general principles of the invention.

Figures 1, 2:
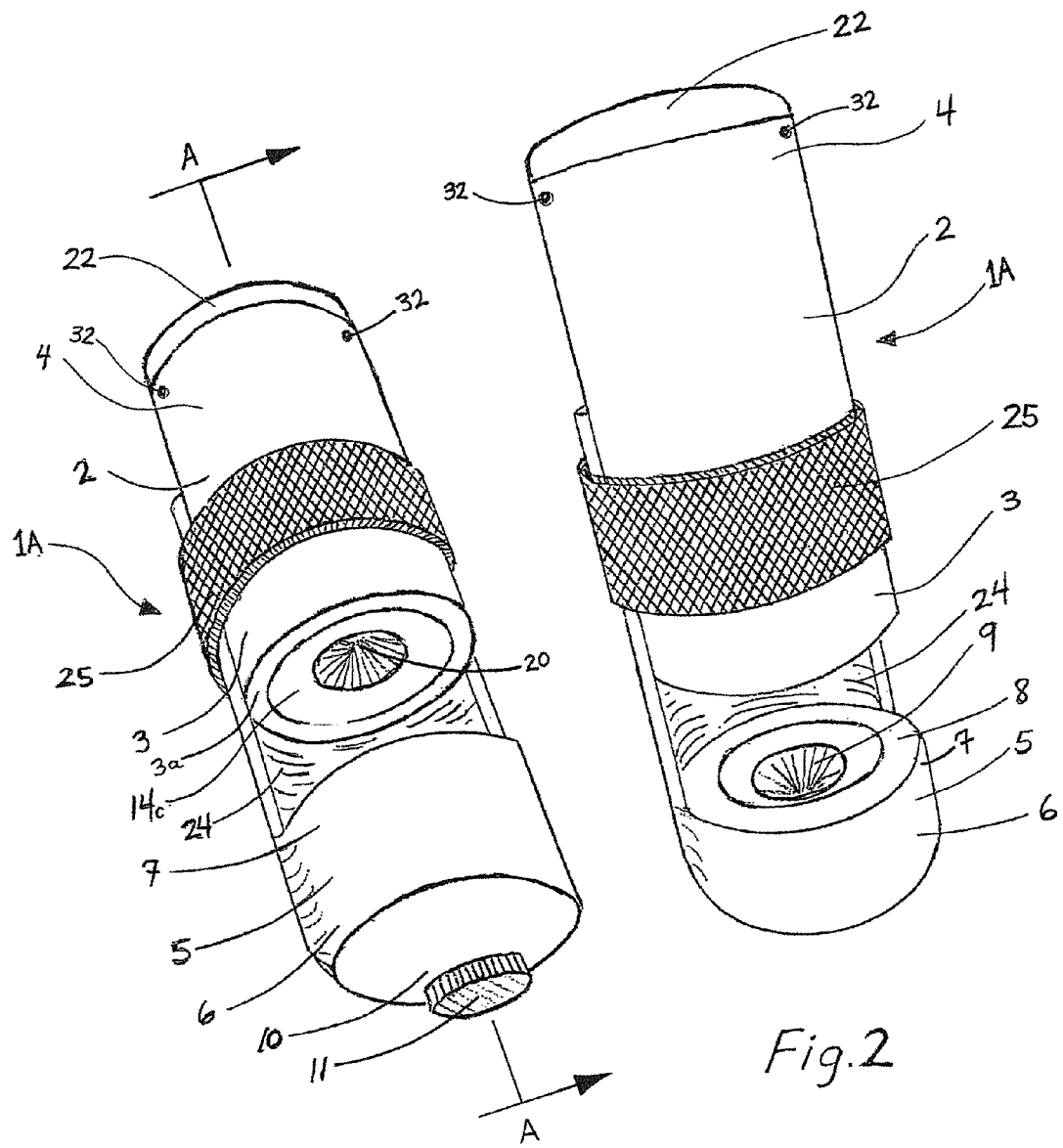
FIG. 1 is a perspective view of a hand-held inertia nutcracker 1A according to one embodiment, shown in an expanded configuration.
FIG. 2 is another perspective view of the hand-held inertia nutcracker 1A of FIG. 1, shown in an expanded configuration.
Figures 6, 7:
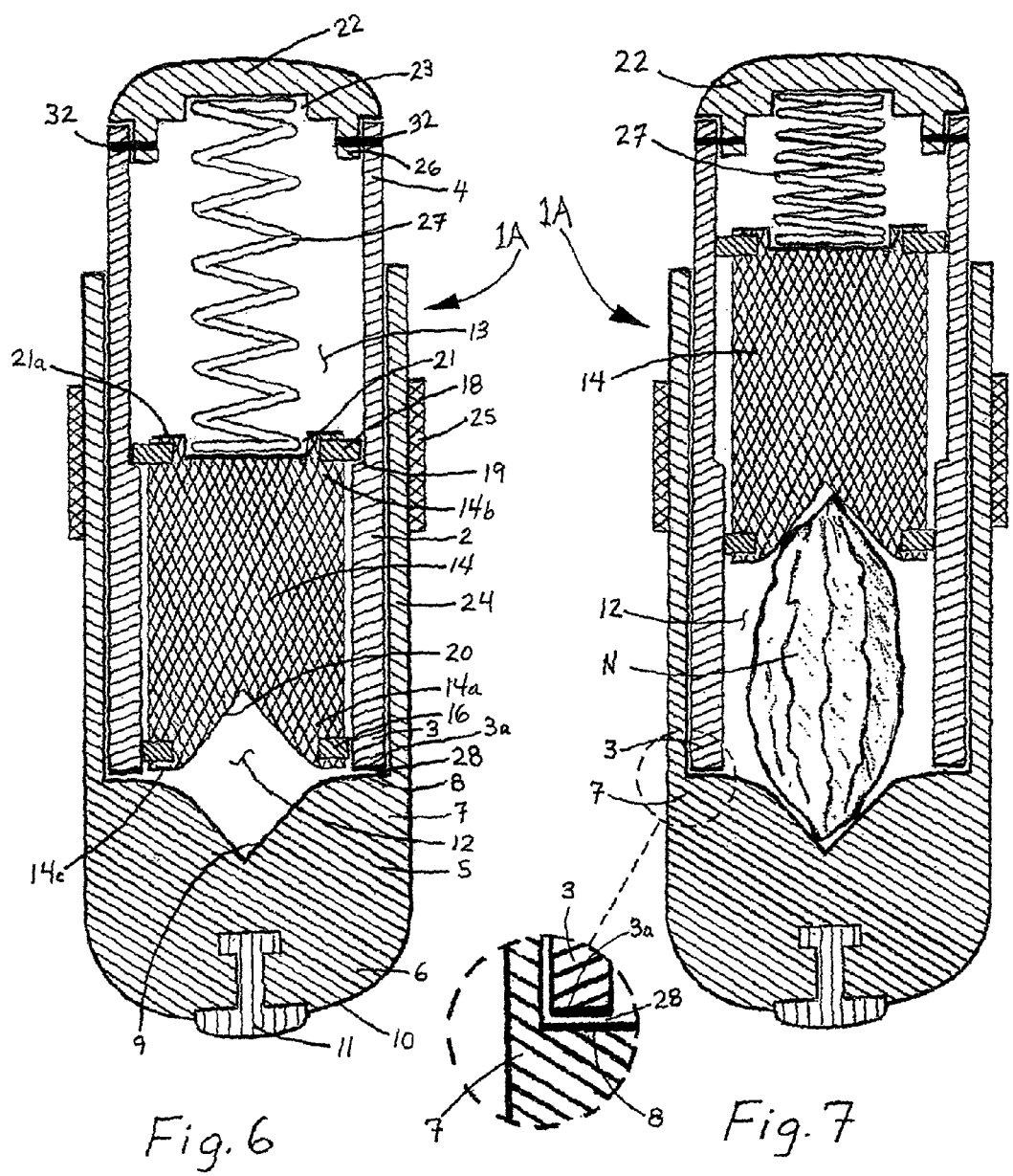
FIG. 6 is a sectional view of the hand-held inertia nutcracker 1A taken along section line A-A of FIG. 1, shown in a compressed configuration.
FIG. 7 is a sectional view of the hand-held inertia nutcracker 1A taken along section line A-A of FIG. 1, shown in a compressed configuration with a nut inserted.

FIG. 1 depicts a perspective view of an embodiment of nutcracker 1A which is shown in an expanded configuration. As shown, nutcracker 1A comprises an upper body member 2 further comprising an upper body member bottom portion 3 and an upper body member top portion 4. Cap 22 is attached to upper body member top portion 4 by pins 32 or other methods not shown (such as screws, adhesives or by threaded flange on cap 22). Impact member bottom end 14c having a conical shaped recess 20 for automatically centering a nut is visible within upper body member bottom portion 3. Further reference to FIG. 1 depicts a lower body member 5 further comprising a lower body member top portion 7 and a lower body member bottom portion 6. In this expanded configuration a nut can be placed in the space between upper body member bottom portion 3 and lower body member top portion 7. Partially shown is a semi-circular thin-wall section 24 as an extension of lower body member top portion 7 which provides a means of alignment during the cracking operation. Attached to thin-wall section 24 is an elastic band 25 which functions to unify upper and lower body members and enhance the means of alignment. Elastic band 25 may be attached to thin-wall section 24 by means of an adhesive or other means (such as rivets or screws). Elastic band 25 is, therefore, not attached to upper body member 2 which thereby allows a sliding movement of upper body member 2 as it is urged toward lower body member 5 into a compressed configuration (with or without a nut) as seen first in FIGS. 6 and 7. Upper body member bottom end 3a represents a surface that will come in contact with lower body member upper surface 8 (seen in FIG. 2) after upper body member 2 is urged into the compressed configuration as seen in FIGS. 6 and 7. Surface 3a and surface 8 remain in mutual contact during the cracking operation which provides containment of nut and nutshell debris within the cracking chamber 12. Rubber stop 11 is attached to the lower body member bottom portion surface 10 which provides sound and impact protection during the cracking operation.

FIG. 2 depicts nutcracker 1A from a different angle in an expanded configuration featuring the lower body member upper surface 8 further comprising: an anvil 9 with centered conical shaped recess 20 for automatically centering the nut and also showing most of the features shown in FIG. 1. Depictions of lower body member 5 (as seen in FIGS. 1 and 2) including features referenced by numbers 6, 7, 8, 9, 10 and 11 are virtually the same and provide the same function in all the embodiments in this disclosure. There can be, however, slight variations in overall (external) shapes of lower body member 5 which largely relate to how structures are attached to (or are an integral part of) lower body member 5 for the purpose of providing a means of retaining alignment between the lower body member 5 and the upper body member 2 while operating the nutcracker.

FIG. 3A shows an alternate embodiment of thin-wall section 24 of lower body member upper portion 7 as seen in FIG. 1 which depicts an alternate means of retaining alignment of upper and lower body members 2 and 5. FIG. 3B shows another alternate embodiment of thin-wall section 24 of lower body member upper portion 7 as seen in FIG. 1 which depicts another means of retaining alignment of upper and lower body members 2 and 5.

FIG. 4 shows an expanded view of nutcracker 1A as seen in FIGS. 1 and 2 depicting the upper body member 2 separated from lower body member 5 with a clear view of thin-wall section 24. FIG. 5 shows an exploded perspective view of the upper body member 2 as seen in FIG. 4 and illustrates the internal components of the nutcracker 1A. Depicted in FIG. 5 is the upper body member 2 further comprising: the bottom surface 3a, the bottom portion 3, and the top portion 4. The bottom portion 3 having a cracking chamber 12 and the top portion 4 having an internal cavity 13 for nutcracker assembly and operation. An internal dimensional transition point 19 approximately midpoint within upper body member 2 is seen which defines a virtual dividing line between internal cavity 13 and cracking chamber 12. The purpose of transition point 19 will be explained when discussing FIG. 6. Pins 32 are shown ready to be placed through holes (not shown) which will be drilled in upper body member top portion 4 and through flange 26 of cap 22 following assembly of internal components (see FIG. 6 for view of inserted pins). Turning now to the upper section of FIG. 5 and viewing the following internal components: felt ring 16 inserts into bottom groove 15 of impact member bottom portion 14a and felt ring 18 inserts into top groove 17 of impact member top portion 14b. Impact member bottom end 14c possesses a centered conical shaped recess 20 for automatically centering a nut, the top end 21a of impact member 14 possesses a centered recess 21 for accepting a biasing spring 27. Impact member 14 perimetrically shaped to fit and slide within the cracking chamber 12 of the upper body member bottom portion 14a. In addition, impact member 14 is perimetrically shaped to fit and slide within the internal cavity 13 of the upper body member top portion during nutcracker operation (FIGS. 6 and 7). The hand-held inertia nutcracker 1A further comprising: an access to upper body member top portion internal cavity 13 by means of cap 22 possessing a flange 26 which inserts inside internal cavity 13 of upper body member top portion 4 and possessing a centered internal recess 23 for centering biasing spring 27. Cap 22 is attached following assembly of impact member 14, felt rings 16 and 18 and biasing spring 27. Cap 22 may be attached by pins 32 or other methods not shown (such as screws, adhesives or a threaded means for attaching cap 22).

Figure 23:
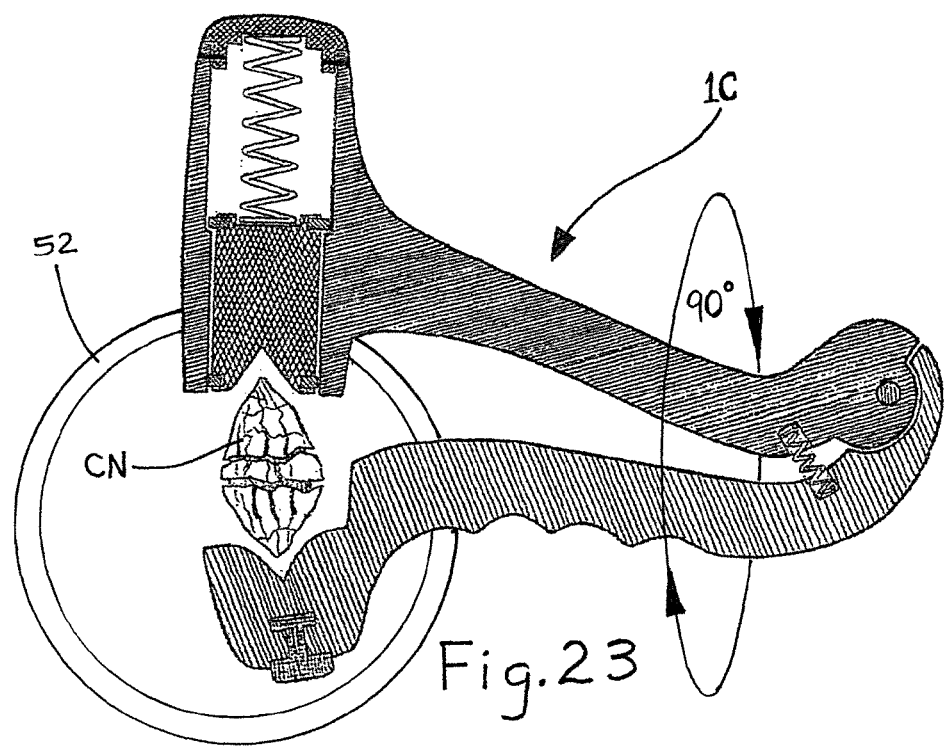

FIG. 6 depicts an assembled sectional view taken along section line A-A of FIG. 1 of nutcracker 1A in a compressed configuration without a nut in the cracking chamber. Rubber stop 11 is shown embedded in lower surface 10 of lower portion 6 of lower body member 5, which provides impact and sound protection while operating the nutcracker. Lower body member top portion 7 further comprises lower body member top surface 8 further comprising an anvil 9 with a centered conical shaped recess 20 for automatically centering the nut. Space 12 describes a cracking chamber as a space between the anvil 9 and conical shaped recess 20 in impact member bottom end 14c. Upper body member bottom end 3a represents a surface that will come in contact with lower body member upper surface 8 (seen as contact point 28) as upper body member 2 is urged into the compressed configuration and guided by thin-wall extension 24 and elastic band 25. Surface 3a and surface 8 remain in mutual contact during the cracking operation which provides containment of nut and nutshell debris within the cracking chamber 12 which virtually eliminates nutshell scatter (see enlarged callout of FIG. 7). Upper body member 2 houses impact member 14, which has felt rings 16 and 18 to provide smooth travel of impact member within the cracking chamber 12 and internal cavity 13 respectively. Felt ring 16 also provides retention of nutshell debris within the cracking chamber 12 and thereby virtually eliminates nutshell debris from entering the internal cavity 13. Felt ring 18, in addition to providing smooth travel of impact member 14 within the internal cavity 13, provides a means of limiting downward travel of impact member 14 as felt ring 18 abuts internal dimensional transition point 19 and thus retains the impact member 14 within the upper body member 2. Impact member top end 21a possesses a centered internal recess 21 for accepting biasing spring 27. Cap 22 possesses a centered internal recess 23 for accepting biasing spring 27 and a flange 26 for a fit into internal cavity 13. Biasing spring 27 provides for the auto-adjusting feature of this nutcracker. The internal components comprise: the impact member 14 with felt rings 16 & 18 and biasing spring 27 which are inserted into the internal cavity 13 prior to attachment of cap 22 by pins 32. Spring 27 has a free length greater than the distance between impact member internal recess 21 and internal recess 23 of cap 22 which provides for a pre-load of impact member 14 as felt ring 18 abuts transition point 19. This pre-load of spring 27 against impact member 14 functions to assist in maintaining continuous contact with nut N during the cracking operation and assists in the ejection of cracked nut (see FIGS. 9D and 23.)

The embodiments of the upper and lower body members 2, 5 and cap 22 in this disclosure were created using a two part liquid polyurethane plastic which was poured into separate molds to create the device. Rubber stop 11 was also created by using a two part liquid rubber poured into a mold. Rubber stop 11 is shown as embedded into the plastic lower body member bottom portion 6 to retain its position, however, other attachment means could be utilized (such as an adhesive or a recess in lower body member bottom surface 10 designed to mechanically retain the rubber stop 11. Materials other than plastic could be used to create the upper and lower body members 2 and 5 and cap 22 such as: a combination of metal and plastic; an alternate material such as zinc, aluminum, stainless steel; or a hardwood or composite material such as fiberglass, ceramic fiber or epoxy to name a few. Impact member 14 in this disclosure was machined from mild steel, however, other materials of sufficient weight and hardness could be utilized such as aluminum or zinc (with sufficient weight added), other metal such as brass, copper, or stainless steel. Felt rings 16 and 18 were used in this embodiment due to their durability and sealing capacity along with their ability slide smoothly within the cracking chamber 12 and internal cavity 13, however, other materials that have similar characteristics could be used such as composite materials, nylon, rubber or Teflon type materials.

FIG. 7 is a sectional view of nutcracker 1A taken along section line A-A of FIG. 1 shown in a compressed configuration with a nut N inserted. This view depicts an enlarged callout of the relationship between upper body member bottom portion 3 bottom surface 3a and lower body member upper portion 7 upper surface 8. Point 28 is shown as the point where surface 3a and surface 8 make and maintain contact during the cracking operation thus providing an enclosed cracking chamber 12 and thereby keeping the nut N and nutshell debris within the cracking chamber 12 during the cracking operation and prior to the spring assisted release of cracked nut into a receptacle. This compressed configuration view shows that nut N has moved impact member 14 upwards toward cap 22 and partially into internal cavity 13 and spring 27 has been compressed to provide contact with nut N prior to and during the cracking operation (see FIGS. 8A, 8B, 8C, 8D and 8E).

Figures 9A, 9B, 9C, 9D:
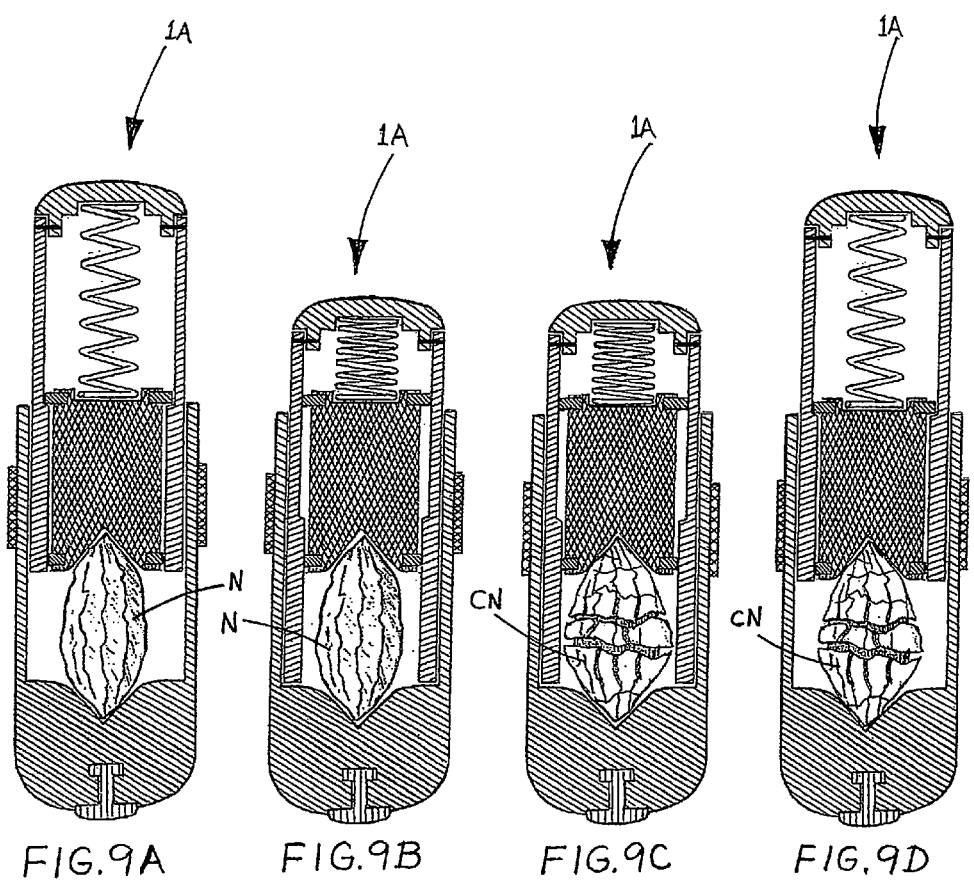
FIG. 9A is a sectional view of the hand-held inertia nutcracker 1A taken along section line A-A of FIG. 1, shown in an expanded configuration with the nut inserted, which correlates with FIG. 8B.
FIG. 9B is a sectional view of the hand-held inertia nutcracker 1A taken along section line A-A of FIG. 1, shown in a compressed configuration following insertion of the nut, which correlates with FIG. 8C.
FIG. 9C is a sectional view of the hand-held inertia nutcracker 1A taken along section line A-A of FIG. 1, showing a compressed configuration following impact and showing a cracked nut, which correlates with FIG. 8E.
FIG. 9D is a sectional view of the hand-held inertia nutcracker 1A along section line A-A of FIG. 1, showing an expanded configuration following impact thus allowing release of cracked nut.

FIGS. 8A through 8E show perspective sequential operational views of nutcracker 1A. FIGS. 9A, 9B and 9C depict sectional sequential views that parallel views of FIGS. 8B, 8C, 8D and 8E. FIG. 8A depicts nutcracker held in the expanded configuration ready for nut N to be placed in between centered conical shaped anvil 9 (FIG. 2) and centered conical shape recess 20 of impact member 14 (FIG. 1). FIG. 8B shows nut N centered between the anvil and the impact member (see FIG. 9A) just before being urged by operators' other hand into the compressed configuration (see FIG. 9B) as shown in FIG. 8C. (Solid surface S provides a working surface for loading a nut as well as providing a surface for impact during cracking operation seen in FIG. 8E). Operator increases his/her grip on nutcracker 1A which retains the compressed configuration due to the semi-circular nature of thin-wall section 24 allowing the operators' grasp to functionally unify upper body member 2 and lower body member 5 which is further enhanced by plastic band 25 (see FIGS. 1 and 2). FIGS. 8D and 8E show the action necessary to crack a nut with nutcracker 1A. In the compressed configuration, with a nut in the cracking chamber, the nutcracker is raised to a comfortable height (FIG. 8D) followed by a swinging action against a solid surface S (FIG. 8E). The force that cracks the nut is inertia. The nutcracker comes to an abrupt stop as it strikes the solid surface S while the impact member 14 does not stop but exerts sudden pressure on the nut N resulting in a cracked nut CN (seen in FIG. 9C). The swing speed can be varied depending on the type of nut being cracked. During the cracking operation nut N remains in contact with both the conical shaped anvil 9 of lower body member and the conical shaped recess 20 of the impact member 14 due to the biasing force exerted continually on the nut by spring 27. This biasing force also allows for the auto-adjusting capability of nutcracker 1A as it can accept a wide variety and sizes of nuts to be cracked. FIG. 9 D shows the nutcracker in the expanded (open) configuration (see FIG. 8A) which allows for the cracked nut CN to be released into a receptacle. As the upper body member and lower body member are guided by the operators' hands into the expanded configuration, the cracked nut CN is simultaneously ejected by the biasing force of spring 27. In this open position another nut can be placed in the nutcracker to be cracked as shown in FIGS. 8A, 8B and 9A (hand opening of nutcracker to release nut into a receptacle is not shown).

FIGS. 10, 11, 12 and 13 show four embodiments of nutcracker 1A in the expanded configuration featuring callouts of sectional views taken along section line A-A of FIG. 1 showing various means for limiting the downward travel of the impact member 14 such that the impact member 14 is retained within the upper body member bottom portion 3. FIG. 10 depicts the preferred means of limiting downward travel and retention of the impact member 14 within the upper body member lower portion 3 of nutcracker 1A (as described in FIGS. 5, 6, 7, 9A, 9B, 9C and 9D). FIG. 10 shows how felt ring 18 located in impact member top portion 14b abuts internal dimensional transition point 19 of upper body member 2 as a means for limiting the downward travel of the impact member 14 such that the impact member 14 is retained within the upper body portion bottom portion 3. FIG. 11 depicts an alternate means of limiting downward travel of impact member 14 by the use of a flexible cord 49 inserted inside spring 27 and attached on one end to a centered point 22a on cap 22; the other end of cord 49 attached to centered point 22b of impact member top surface 14b thus functioning to retain impact member 14 within upper body member bottom portion 3. FIG. 12 shows another means of limiting downward travel of impact member 14 by modifying the shape of upper body member bottom portion 3 to form a right angle 3b such that felt ring 16 located in impact member bottom portion 14a engages right angle 3b in a way that retains impact member 14 within upper body member bottom portion 3. FIG. 13 shows yet another means of limiting downward travel of impact member 14 by adding a mechanical barrier 3c which is attached to upper body member bottom portion 3 which abuts impact member bottom end 14c (this differs from FIG. 12 which abuts felt ring 16) and thus functions as a means of retaining impact member 14 within upper body member bottom portion 3.

FIGS. 14A, 14B and 14C depict perspective views of another embodiment of a nutcracker designated by reference number 1B. This embodiment operates in the same way as nutcracker 1A and has identical internal components. The difference is primarily regarding the means of alignment. Additionally, the means of limiting downward travel and retention of impact member 14 within the upper body is the same as the preferred means described in FIG. 10. FIG. 14A depicts nutcracker 1B in a compressed configuration showing upper body member 2 and lower body member 5 and cap 22 to enclose internal components (not shown). External features differ from nutcracker 1A in that lower body member accommodates alignment rods 29 which slide in holes of upper body member 2. FIG. 14B shows nutcracker 1B in an expanded configuration showing alignment rods 29 fixed in lower body member 5 and extending through holes 30 of upper body member 2 thus allowing a sliding motion of upper body member which provides a means of alignment which differs from the means of alignment shown in FIGS. 1, 2, 3A, 3B and 4. FIG. 4C shows nutcracker 1B in a partially disassembled perspective view featuring rods 29 and holes 30 in upper body member in addition to indentations 31 for grasping nutcracker to retain closed configuration during the cracking operation as described in FIGS. 8A through 8E.

FIG. 15 is a side elevation of the preferred embodiment 1C of a nutcracker and is shown in a compressed configuration with handles attached which provide the preferred means of alignment of upper body member 2 and lower body member 5. FIG. 15 depicts a nutcracker 1C having an upper body member 2 and a lower body member 5 which are substantially the same as seen in earlier embodiments (FIGS. 1 through 14C). In addition, the internal components (see FIG. 16) are identical as those shown in FIGS. 5, 6, 7, 9A, 9B, 9C, 9D and 10. In this preferred embodiment, nutcracker 1C comprises an upper body member 2 and a lower body member 5 further comprising: a first handle 33 having a head end 50 and a hinge end 40, the head end 50 attached to the upper body member 2, a second handle 34 having a head end 51 and a hinge end 41, the head end 51 attached to the lower body member 5, and the hinge ends of both 40 and 41 of the first and second handles 33 and 34 movably coupled by hinge pin 44. Spring 35 biases first and second handle 33 and 34 toward an expanded configuration and provides the controlling force for opening nutcracker 1C for accepting a nut to be cracked and for the releasing of cracked nut into a receptacle. FIG. 15 shows a general overview of the main external components and approximate angles which were designed for operator comfort and smooth operation of nut cracker during the cracking process. Handle angle line HAL shows an approximate angle of first and second handles 33 and 34 relative to center line CL designed to provide an ergonomically comfortable hand position for the operator during the cracking operation (see FIGS. 20 and 21). Handle angle line HAL determined the approximate placement of hinge pin 44 on perpendicular line PL in this preferred embodiment as hinge ends 40 and 41 of first and second handles 33 and 34 are shown to angle away from handle angle line HAL toward perpendicular line PL (a line that is perpendicular to center line CL). Point P is the point where upper body member 2 and lower body member 5 meet in the compressed configuration which determined the approximate hinge pin 44 placement on perpendicular line PL. Hinge line HL describes a line from hinge pin 44 through center of spring 35. Spring line SL is a longitudinal line through spring 35 and is perpendicular to hinge line HL. All of the approximate angles in the preferred embodiment of nutcracker 1C were determined through experimental models and prototypes.

FIG. 16 is an assembled sectional view taken along section line B-B of FIG. 15 in a compressed configuration without a nut in the cracking chamber showing the preferred embodiment of nutcracker 1C. Rubber stop 11 is shown embedded in lower surface 10 of lower portion 6 of lower body member 5 which provides impact and sound protection while operating the nutcracker. Lower body member top portion 7 further comprising an anvil 9 with a centered conical shaped recess for automatically centering the nut. Space 12 describes a cracking chamber as a space between the anvil 9 and conical shaped recess 20 in impact member bottom end 14c. Upper body member bottom portion 3 bottom end 3a represents a surface that will come in contact with lower body member 7 upper surface 8 creating a contact point 28 as upper body member 2 is urged into the compressed configuration (see enlarged callout). Surface 3a and surface 8 remain in mutual contact during the cracking operation which provides containment of nut and nutshell debris within the cracking chamber 12 which virtually eliminates nutshell scatter. Upper body member 2 houses impact member 14 which has felt rings 16 and 18 which provide smooth travel of impact member within the cracking chamber 12 and internal cavity 13 respectively. Felt ring 16 also provides retention of nutshell debris within the cracking chamber 12 and thereby virtually eliminates nutshell debris from entering the internal cavity 13 (see enlarged callout further detailing felt ring 16). Felt ring 18, in addition to providing smooth travel of impact member 14 within the internal cavity 13, provides the preferred means of limiting downward travel of impact member 14 as felt ring 18 abuts internal dimensional transition point 19 and thus retains the impact member 14 within the upper body member 2 (see enlarged callout of FIG. 10). Impact member top end 21a possesses a centered internal recess 21 for accepting biasing spring 27. Cap 22 possesses a centered internal recess 23 for accepting biasing spring 27 and a flange 26 for a fit into internal cavity 13. Biasing spring 27 provides for the auto-adjusting feature of this nutcracker. The internal components comprise: the impact member 14 with felt rings 16 and 18 and biasing spring 27 which are inserted into the internal cavity 13 prior to cap 22 attachment by pins 32. Spring 27 has a free length greater than the distance between impact member internal recess 21 and internal recess 23 of cap 22 which provides for a pre-load of impact member 14 as felt ring 18 abuts transition point 19. This pre-load of spring 27 against impact member 14 functions to assist in maintaining continuous contact with nut N during the cracking operation and assists in the ejection of cracked nut (see FIGS. 9D and 23.) In this preferred embodiment, nutcracker 1C comprises an upper body member 2 and a lower body member 5 further comprising: a first handle 33 having a head end 50 and a hinged end 40, the head end 50 attached to the upper body member 2; a second handle 34 having a head end 51 and a hinged end 41, the head end 51 attached to the lower body member 5, and the hinged ends of both 40 and 41 of the first and second handles 33 and 34 are biased by hinge spring 35 and movably coupled by hinge pin 44. The first handle 33 further comprising: a center portion having a length of from four inches to seven inches thus providing a surface which accommodates a fit into a person's palm for operating the hand-held inertia nutcracker 1C. The second handle further comprising: a center portion having a length of from four inches to seven inches thus providing a surface which accommodates a fit around which a person's fingers grip for operating the hand-held inertia nutcracker 1C. Spring 35 provides the controlling force for opening the hand-held inertia nutcracker 1C for accepting a nut to be cracked and for the releasing of cracked nut into a receptacle. Surfaces 40b and 41b on extended portions of first and second handle hinge ends 40 and 41 create a stopping point when nutcracker is in the expanded configuration which functions to limit the opening between the upper and lower body members 2 and 5.

The embodiments of the upper and lower body members 2 and 5 (including first and second handles 33 and 34 as integral parts of upper and lower body members 2 and 5) and cap 22 in this disclosure were created using a two part liquid polyurethane plastic which was poured into separate melds to create the nutcracker. Rubber stop 11 (which was also created by using a two part liquid rubber poured into a mold) is shown as embedded into the plastic lower body member bottom portion 6 to retain its position, however, other attachment means could be utilized (such as an adhesive or a recess in lower body member bottom surface 10 designed to mechanically retain the rubber stop 11. Materials other than plastic could be used to create the upper and lower body members 2 and 5 and cap 22 such as: a combination of metal and plastic; an alternate material such as zinc, aluminum, stainless steel; or a hardwood or composite material such as fiberglass, ceramic fiber or epoxy to name a few. Impact member 14 in this disclosure was machined from mild steel, however, other materials of sufficient weight and hardness could be utilized such as aluminum or zinc (with sufficient weight added), other metal such as brass, copper, or stainless steel. Felt rings 16 and 18 were used in this embodiment due to their durability and sealing capacity along with their ability slide smoothly within the cracking chamber 12 and internal cavity 13, however, other materials that have similar characteristics could be used such as composite materials, nylon, rubber or Teflon type materials.

Figure 17:
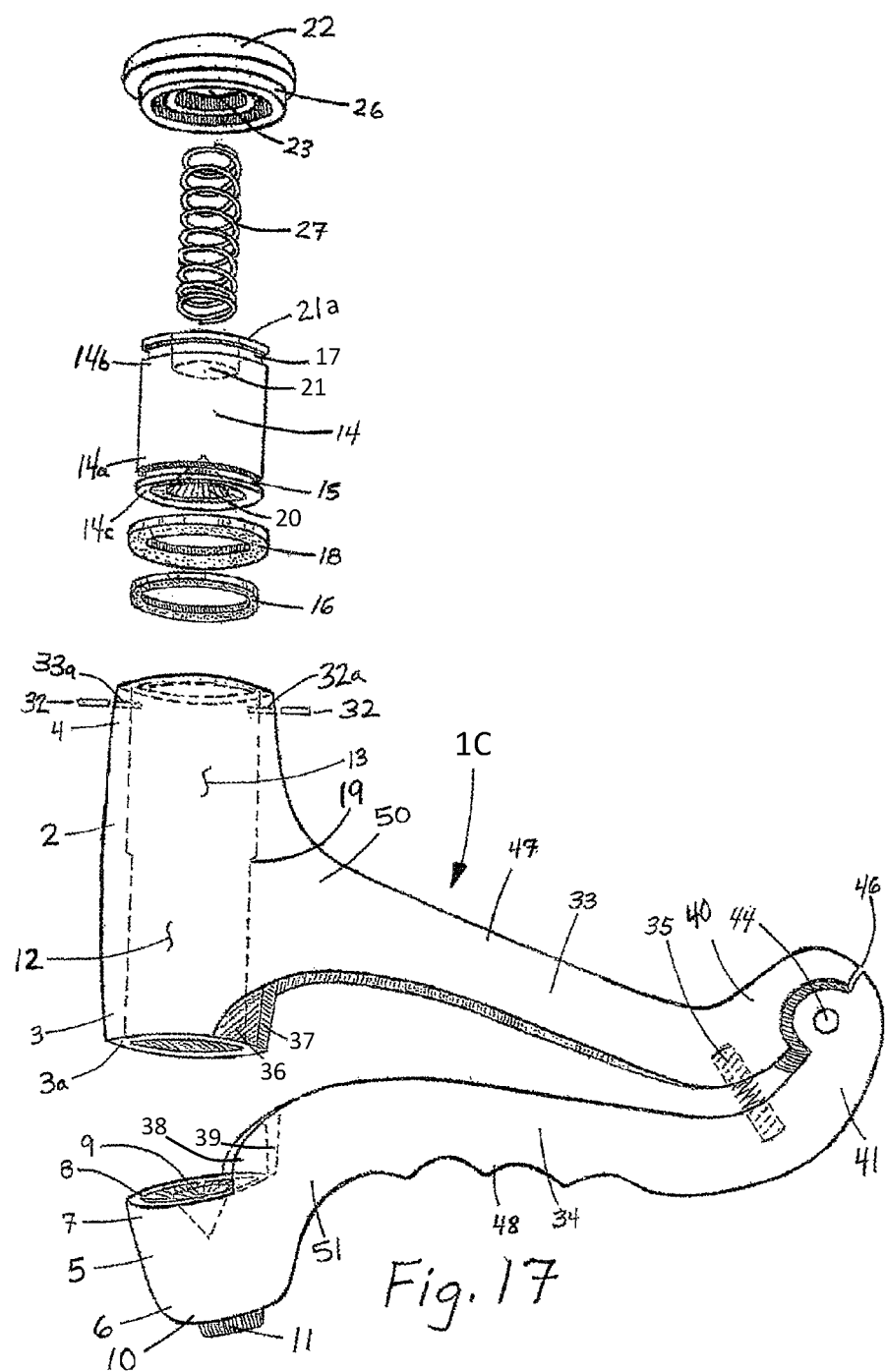
FIG. 17 is an exploded perspective view of the hand-held inertia nutcracker 1C, shown in an expanded configuration.
Figure 18:
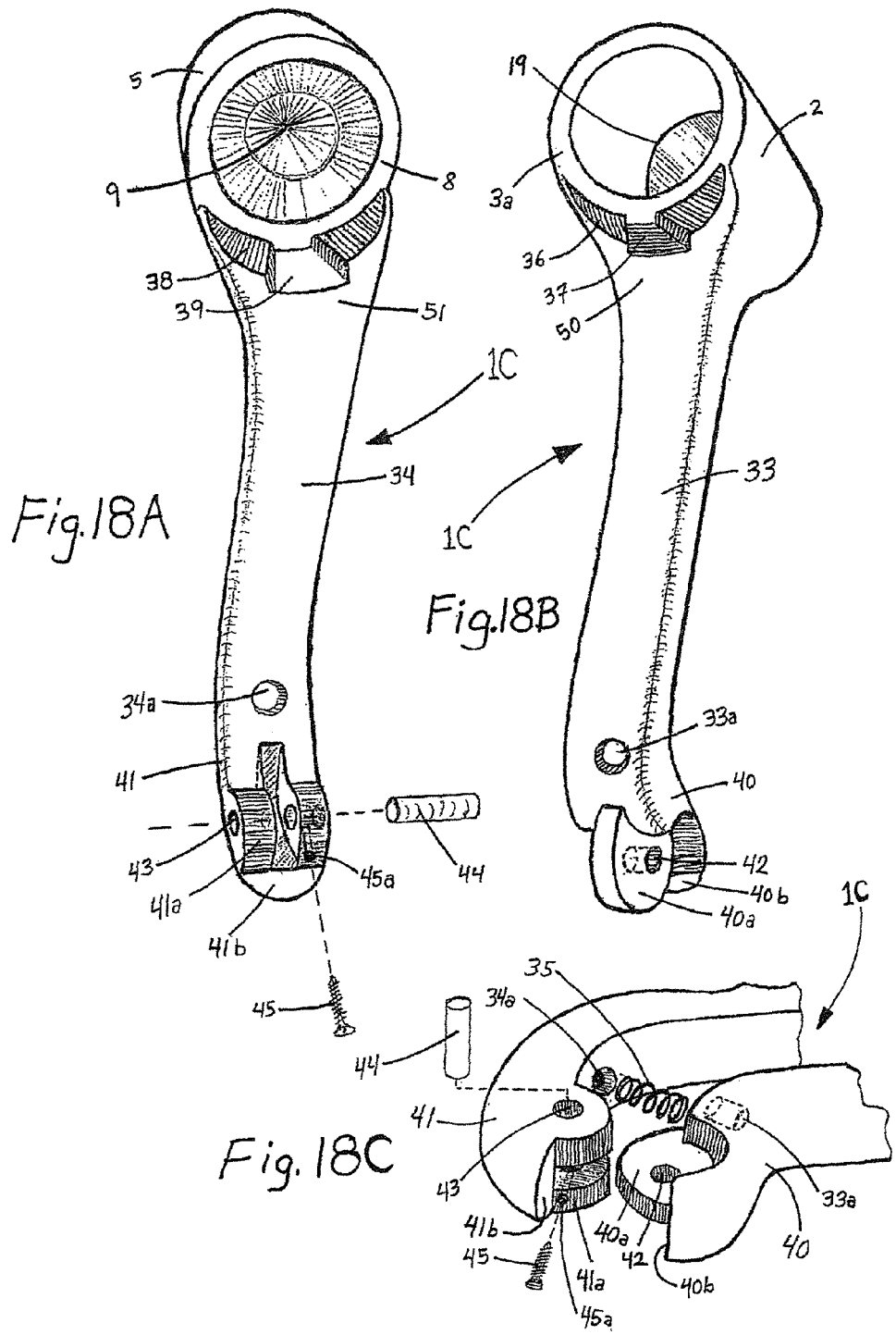
FIG. 18A is an exploded perspective view of the hand-held inertia nutcracker 1C lower body member with a second handle, showing means of alignment features.
FIG. 18B is a perspective view of the hand-held inertia nutcracker 1C, upper body member with a first handle, showing means of alignment features.
FIG. 18C is an exploded perspective partial view of the hand-held inertia nutcracker 1C, showing first and second handle hinge ends and component parts.
Figure 19:
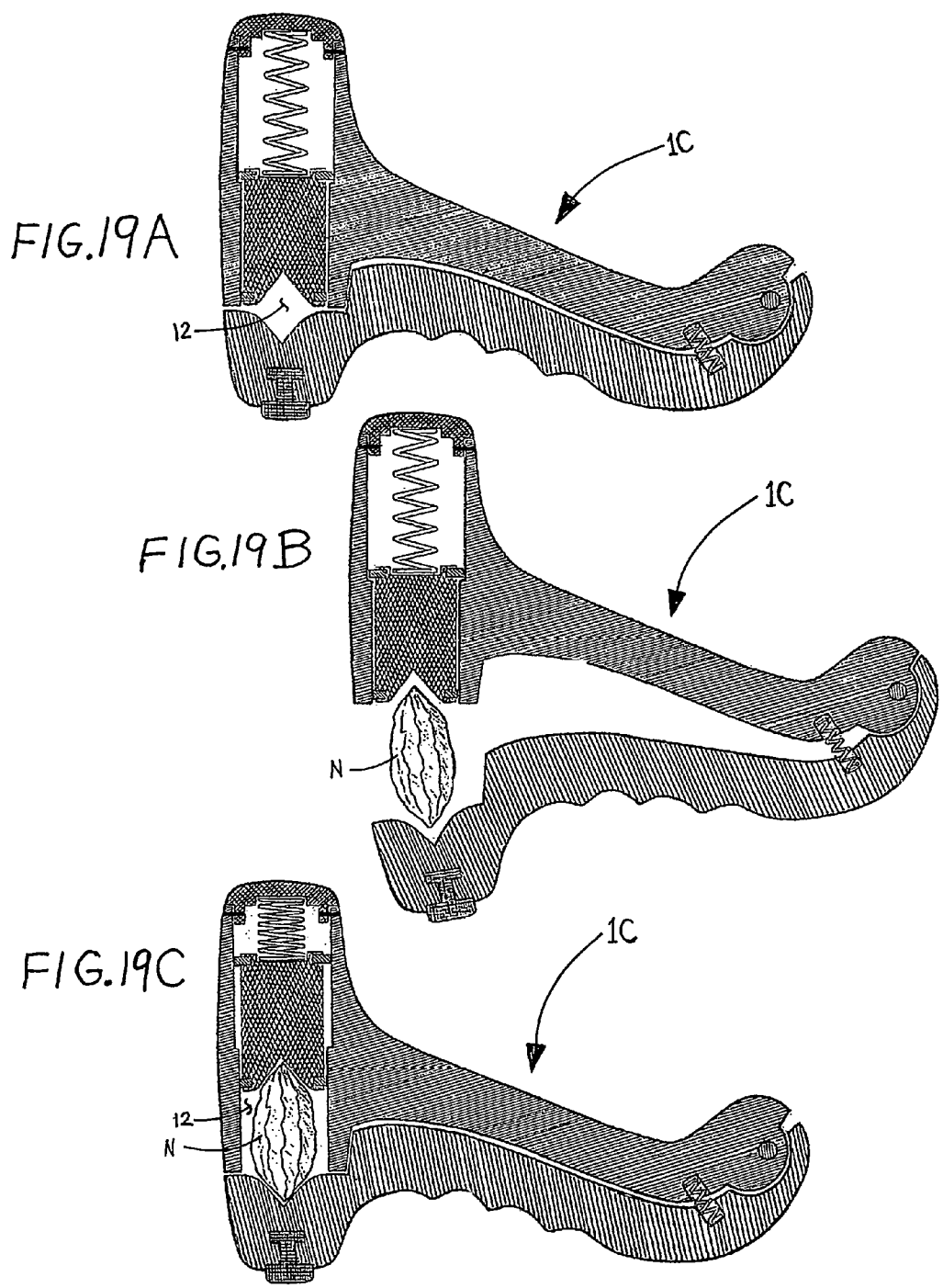
FIG. 19A is a sectional view of the hand-held inertia nutcracker 1C taken along the section line B-B of FIG. 15, shown in a compressed configuration.
FIG. 19B is a sectional view of the hand-held inertia nutcracker 1C taken along section line B-B of FIG. 15, shown in an expanded configuration with a nut inserted, which correlates with FIGS. 8B & 9A.
FIG. 19C is a sectional view of the hand-held inertia nutcracker 1C taken along section line B-B of FIG. 15, shown in a compressed configuration with the nut inserted and ready for cracking, which correlates with FIGS. 8C & 9B.

FIG. 17 depicts an exploded perspective view of nutcracker 1C as the preferred embodiment in an expanded configuration. Upper body member 2 of nutcracker 1C further comprising: the bottom surface 3a, the bottom portion 3, and the top portion 4. The bottom portion 3 having a cracking chamber 12 and the top portion 4 having an internal cavity 13 for nutcracker assembly and operation. An internal dimensional transition point 19 approximately midpoint within upper body member 2 is seen which defines a virtual dividing line between internal cavity 13 and cracking chamber 12. The purpose of transition point 19 is explained in FIGS. 6, 10 and 16. Turning now to the upper section of FIG. 17 and viewing the internal components; felt ring 16 inserts into bottom groove 15 of impact member bottom portion 14a and felt ring 18 inserts into top groove 17 of impact member top portion 14b. Impact member bottom end 14c possesses a centered conical shaped recess 20 for automatically centering a nut, the top end 21a of impact member 14 possesses a centered recess 21 for accepting a biasing spring 27. Impact member 14 is perimetrically shaped to fit and slide within the cracking chamber 12 of the upper body member bottom portion 14a. In addition, impact member 14 is perimetrically shaped to fit and slide within the internal cavity 13 of the upper body member top portion during nutcracker operation (FIGS. 6 and 7). The hand-held inertia nutcracker 1C further comprising: an access to upper body member top portion internal cavity 13 by means of cap 22 having a flange 26 which inserts inside internal cavity 13 of upper body member top portion 4 and possessing a centered internal recess 23 for centering biasing spring 27. Cap 22 is attached following assembly of impact member 14, felt rings 16 and 18 and biasing spring 27. Cap 22 may be attached by pins 32 (discussed in FIG. 5) or other methods not shown (such as screws, adhesives or a threaded means for attaching cap 22). Reference numbers in FIG. 17 regarding upper body member 2 and lower body member 5 including the first and second handles 40 and 41 are previously covered and discussed in FIGS. 15 and 16 except for the following: 36, 37, 38, 39 and 46. Seen in 36 and 37 are structures for enhancing alignment and lateral stability when they mate with complementary structures 38 and 39 (in the compressed configuration) which are more clearly defined and pictured in FIG. 18. Point 46 located between extensions of first and second handle hinge ends 40 and 41 (seen in FIG. 16) shows a point where surface 40b abuts surface 41b which functions to limit the degree of opening of nutcracker 1C and functions to retain handle spring 35 following assembly of the hinge components so that the hand-held inertia nutcracker is fully assembled and ready for operation.

FIG. 18A depicts an exploded perspective view of lower body member 5, second handle 34 and hinge end 41 details in addition to second handle head end 51 and associated alignment enhancement features 38 and 39. Lower body member 5 has a top surface 8 containing centered conical shaped recess 9 for automatically centering a nut. Second handle 34 has a head end 51 that possesses a concave shape 38 further comprising a wedge shaped recess 39. Second handle 34 further comprises a hinge end 41 possessing a shallow hole 34a for accepting spring 35 (seen in FIGS. 15, 16, 17 and 18C). Hinge pin 44 inserts into hole 43 of clevis 41a and retaining screw 45 goes into hole 45a and into shallow hole 45b following insertion of tang 40a (FIGS. 18B and 18C) into clevis 41a. Surface 41b is a surface on extension portion of hinge end 41 (first shown in FIG. 16) and functions to limit degree of opening of nutcracker.

FIG. 18B depicts a perspective view of upper body member 2, first handle 33 and hinge end 40 details in addition to first handle head end 50 and associated alignment enhancement features 36 and 37. Upper body member 2 shows internal dimensional transition point 19 and surface 3a. Upper body member 2 further comprises an external convex surface 36 and wedge shaped structure 37 (near surface 3a and first handle head end 50) which forms a fit into the alignment enhancement features 38 and 39 of FIG. 18A when nutcracker 1C is in the compressed configuration as seen in FIGS. 15 and 16. Also shown in FIG. 18B are hinge end 40 details consisting of shallow hole 33a for accepting spring 35 (FIG. 18C) and hole 42 through tang 40a. Surface 40b is a surface on extension portion of hinge end 40 (first shown in FIG. 16) and functions to limit degree of opening of nutcracker.

FIG. 18C depicts an exploded perspective view of first handle 33 hinge end 40 and second handle 34 hinge end 41 of nutcracker 1C. Method of assembly is as follows: Handle spring is inserted into shallow hole 34a; tang 40a is partially inserted into clevis 41a as handle spring 35 free end is guided into shallow hole 33a; hinge ends 40 and 41 are then squeezed together to fully engage tang 40a and clevis 41a and simultaneously retaining handle spring 35 in shallow holes 34a and 33a; hinge pin 44 is inserted into hole 43 and then through hole 42 and secured in place with screw 45 into hole 45a. In the fully assembled state, surface 41b and surface 40b interact to limit degree of opening of nutcracker first seen in FIG. 16 (and in all subsequent FIGS. 19-23). Other types of hinge pins could be used that may not require a screw for retention such as a two piece threaded pin with enlargements on the ends to provide retention. Other types of springs could be used in place of the compression spring shown in this embodiment such as a torsion type spring or a flat spring made of spring steel (similar to that used in a pair of tongs).

Figures 20, 21:
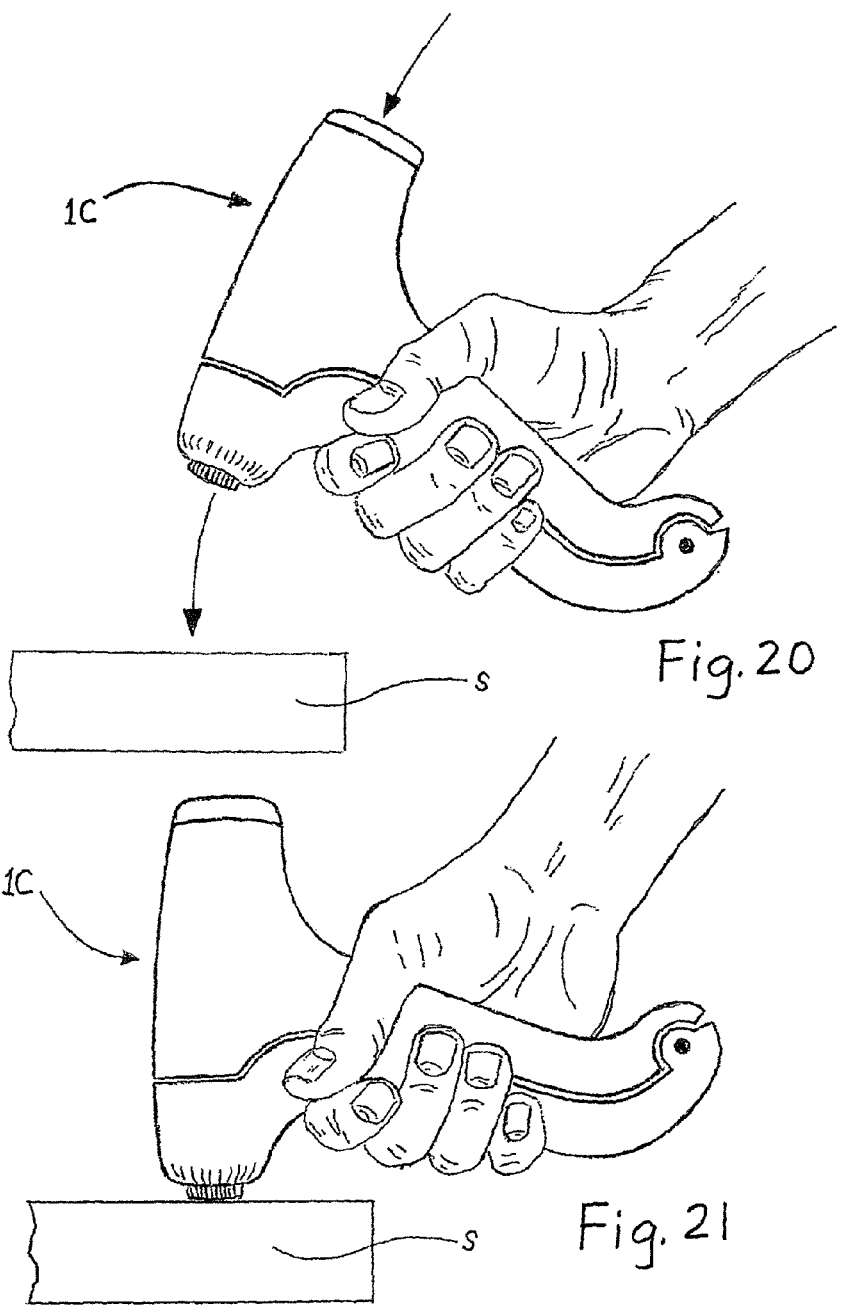
FIG. 20 is a perspective operational view of the hand-held inertia nutcracker 1C, an arrow indicating a swinging action required to crack the nut, which correlates with FIG. 8D.
FIG. 21 is a perspective operational view of the hand-held inertia nutcracker 1C, showing an impact position, which correlates to FIG. 8E.
Figure 22:
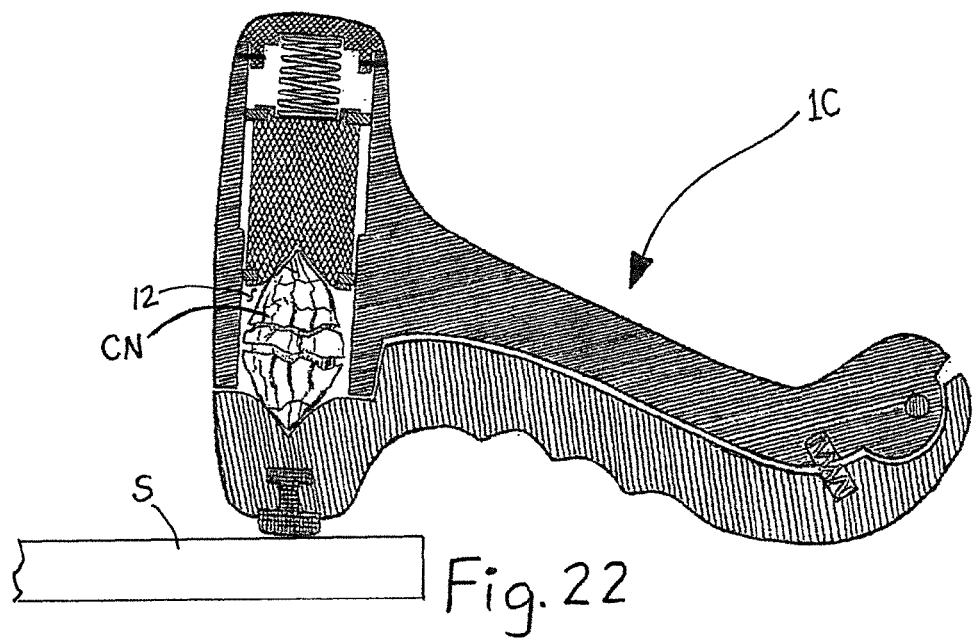
FIG. 22 is a sectional view of the hand-held inertia nutcracker 1C taken along section line B-B of FIG. 15, shown in a compressed configuration following impact, resulting in a cracked nut, which correlates to FIG. 9C; and, FIG. 23 is a sectional view of the hand-held inertia nutcracker 1C taken along section line B-B of FIG. 15, shown in an expanded configuration, allowing the cracked nut to be released

FIGS. 19A, 19B and 19C depict sectional sequential views of nutcracker 1C. The various configurations shown here are better understood if viewed with the perspective of how a person's hand holds the nutcracker as seen in FIG. 20 and FIG. 21. With this perspective in mind and although a hand is not shown, FIG. 19A shows the nutcracker 1C in a compressed configuration without a nut. (see again FIG. 20) FIG. 19B shows the nutcracker in a fully expanded configuration with an un-cracked nut being placed in the open nutcracker (see FIGS. 8A and 8B). FIG. 19C shows the nutcracker in the compressed configuration with an un-cracked nut N in the cracking chamber 12 and ready for the cracking operation as seen in FIG. 20 as the nutcracker is raised to an appropriate height and then swung downward and impacting a solid surface S at which time the nutcracker comes to an abrupt stop (FIG. 21). The impact member (which is biased against the nut) does not stop, but exerts sudden pressure on the nut due to inertia, which is the force that cracks the nut. This force can be varied by modifying the swing speed of the nutcracker by the operator depending on the type of nut being cracked. FIG. 22 shows the cracked nut CN following impact (FIG. 21) as contained within the cracking chamber 12 prior to operator first rotating hand holding nutcracker about 90 degrees and then releasing his/her grip which releases cracked nut CN into receptacle 52. In this open position a new nut can be placed in nutcracker ready for cracking.

What is claimed is:

1. A hand-held inertia nutcracker for cracking and removing shells from a variety of nuts, comprising:
   an upper body member, comprising:
      an upper body member bottom portion and an upper body member top portion, the upper body member bottom portion possessing a cracking chamber, the upper body member top portion possessing an internal cavity having an open top end;
      a free-floating impact member with a bottom end possessing a centered recess for automatically centering a nut, the impact member perimetrically shaped to fit and freely slide within the cracking chamber of the upper body member bottom portion;
      a cap enclosing the open top end of the upper body member top portion;
      a first spring positioned in the upper body member top portion internal cavity and in contact with the impact member on one end of the spring, and in contact with the cap on an opposite end of the spring, such that the impact member automatically adjusts its position to a size of the nut;
      a means for limiting the downward travel of the impact member such that the impact member is retained within the upper body member bottom portion;
   a lower body member, comprising:
      a lower body member bottom portion and a lower body member top portion, wherein the lower body member top portion comprises an anvil with a centered recess on its upper surface for automatically centering the nut, and the lower body member bottom portion possessing a striking surface for striking the nutcracker on a rigid surface; and
   a means for aligning the lower body member and the upper body member.

2. The hand-held inertia nutcracker of claim 1, wherein the impact member further comprises a bottom groove around the perimeter of the impact member bottom portion, and a top groove around the perimeter of the impact member top portion.

3. The hand-held inertia nutcracker of claim 2, further comprising a first O-ring seal comprising: an outside edge surface shaped and dimensioned equal to an inside surface of the cracking chamber; and an inside edge surface shaped and dimensioned equal to an outside surface of the bottom groove of the impact member; and located within the bottom groove of the impact member bottom portion such that the first O-ring seal functions as a guide to facilitate smooth travel of the impact member within the cracking chamber and for keeping nut debris within the cracking chamber.

4. The hand-held inertia nutcracker of claim 3, further comprising: a second O-ring seal comprising: an outside edge surface shaped and dimensioned equal to an inside surface of the internal cavity of the upper body member top portion; and an inside edge surface shaped and dimensioned equal to an outside surface of the top groove of the impact member; and located within the top groove of the impact member top portion such that the second O-ring seal functions as a guide to facilitate smooth travel of the impact member within the internal cavity and as a stop for limiting a longitudinal travel of the impact member past a predetermined point; and wherein an outer diameter of the second O-ring seal is greater than an outer diameter of the first O-ring seal.

5. The hand-held inertia nutcracker of claim 1, wherein an internal diameter of the cracking chamber of the upper body member bottom portion is smaller than an internal diameter of the internal cavity of the upper body member top portion, thus creating a shoulder approximately midway inside the upper body member.

6. The hand-held inertia nutcracker of claim 4, wherein the impact member's second O-ring seal is slidably confined to the larger diameter internal cavity, and the impact member's first O-ring seal is slidably confined to the smaller diameter cracking chamber; wherein an internal shoulder creates a barrier wherein the second O-ring seal of the impact member is prevented from entering the cracking chamber, thereby providing the means of limiting downward travel of the impact member, and thus retaining the impact member within the upper body member bottom portion.

7. The hand-held inertia nutcracker of claim 1, wherein the striking surface comprises a resilient bumper located on the lower body member bottom portion surface such that the resilient bumper provides reduced sound and impact protection while operating the nutcracker.

8. The hand-held inertia nutcracker of claim 1, further comprising: an opening in the upper body member internal cavity top portion; the cap having a centered internal recess for accepting an end of the spring, which biases against the impact member top end.

9. The hand-held inertia nutcracker of claim 1, further comprising: a first handle having a head end and a hinge end, the head end attached to the upper body member, a second handle having a head end and a hinge end, the head end attached to the lower body member, and the hinged ends of both the first and second handles are movably coupled together.

10. The hand-held inertia nutcracker of claim 9, wherein the first handle further comprises: a center portion having a length of from four inches to seven inches, thus providing a surface which accommodates a fit into a person's palm for holding the hand-held inertia nutcracker.

11. The hand-held inertia nutcracker of claim 9, wherein the second handle further comprises: a center portion having a length of from four inches to seven inches, thus providing a surface which accommodates a fit around which a person's fingers grip for holding the hand-held inertia nutcracker.

12. The hand-held inertia nutcracker of claim 9, further comprising: the first handle hinge end having a semicircular tang; the second handle hinge end having a semicircular clevis; the semicircular tang mating with the semicircular clevis, and is secured with a pin, thereby providing the means of aligning the lower body member with the upper body member while operating the hand-held inertia nutcracker.

13. The hand-held inertia nutcracker of claim 9, further comprising: a handle spring; the first end of the handle spring inserts into a shallow hole of the first handle hinge end, and the second end of the handle spring inserts into a shallow hole of the second handle hinge end; the handle spring providing an opening force for opening the hand-held inertia nutcracker for accepting a nut to be cracked.

14. The hand-held inertia nutcracker of claim 12, further comprising: an extension of the first handle hinge end which extends past the tang and an extension of the second handle hinge end which extends past the clevis such that the two extensions abut when the device is in the fully open position, thereby providing a means of limiting the angle of opening for accepting a nut to be cracked and also functions to retain the handle spring following the assembly of the hinge components so that the hand-held inertia nutcracker is fully assembled and ready for operation.

15. The hand-held inertia nutcracker of claim 1, wherein the means for aligning the lower body member and the upper body member comprises a semi-circular thin-walled section with an elastic retaining band.

16. The hand-held inertia nutcracker of claim 1, wherein a top end of the impact member comprises an internal recess for accepting an end of the first spring.

17. The hand-held inertia nutcracker of claim 1, wherein the first spring is pre-loaded with a compressive force when the nutcracker is closed with a nut inside of the cracking chamber.

18. The hand-held inertia nutcracker of claim 3, wherein the first O-ring seal is a felt seal.

19. The hand-held inertia nutcracker of claim 4, wherein the second O-ring seal is a felt seal.

20. The hand-held inertia nutcracker of claim 9, wherein the first handle comprises an external converse surface, and the second handle comprises a complementary mating wedge-shaped structure for aligning the first and second handles when the nutcracker is closed.

21. The hand-held inertia nutcracker of claim 9, further comprising: a handle spring comprising a leaf spring made of spring steel; the handle spring providing an opening force for opening the hand-held inertia nutcracker for accepting a nut to be cracked.

22. The hand-held inertia nutcracker of claim 1, wherein the means for aligning the lower body member and the upper body member comprises a pair of parallel guide rods disposed on opposite sides of the nutcracker.

23. The hand-held inertia nutcracker of claim 1, where the upper body member and the lower body member are cylindrical.

24. The hand-held inertia nutcracker of claim 1, where both centered recesses are conically-shaped recesses.

25. A method of cracking and removing a nut, comprising the steps of:
(a) placing a nut in the hand-held inertia nutcracker of claim 1;
(b) closing the nutcracker, whereby the nut pushes the impact member into a retracted position, which pre-loads the spring in compression;
(c) raising the nutcracker in the air and then striking a rigid surface with the striking end of the nutcracker;
(d) stopping the motion of the nutcracker on the rigid surface;
(e) applying a compressive impulse force to the nut by the downward-moving impact member, thereby cracking it;
(f) confining the nut and nutshell debris in the cracking chamber; and
(g) opening the nutcracker and removing the cracked nut and nutshell debris from the nutcracker.

26. The method of claim 25, further comprising, when closing the nutcracker, using the first spring to urge the impact member to make contact with the nut, prior to raising and striking the nutcracker on a rigid surface.

27. The method of claim 25, further comprising using a stop to limit a longitudinal travel of the impact member down the upper body member past a predetermined point.

28. The method of claim 27, wherein the stop comprises an internal shoulder.

* * * * *